US012729018B2

(12) United States Patent
Merk et al.

(10) Patent No.: US 12,729,018 B2
(45) Date of Patent: Sep. 8, 2026

(54) AIRCRAFT LANDING GEAR SUPPORT FIXTURES

(71) Applicant: Gulfstream Aerospace Corporation, Savannah, GA (US)

(72) Inventors: Andrew P. Merk, Savannah, GA (US); Nathan Coffee, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 294 days.

(21) Appl. No.: 18/670,193

(22) Filed: May 21, 2024

(65) Prior Publication Data

US 2025/0361032 A1 Nov. 27, 2025

(51) Int. Cl.
*B64F 5/60* (2017.01)

(52) U.S. Cl.
CPC .................................... *B64F 5/60* (2017.01)

(58) Field of Classification Search
None
See application file for complete search history.

(56) References Cited

U.S. PATENT DOCUMENTS

2019/0049287 A1* 2/2019 Nance .................... B64D 45/00
2019/0233091 A1* 8/2019 Johnson .................. B64C 25/34
2020/0207463 A1* 7/2020 Schuster ................. B64C 25/40
2022/0127016 A1* 4/2022 Schmidt .................. B64C 25/60
2024/0010329 A1* 1/2024 Griffin ...................... B64F 5/60
2025/0100678 A1* 3/2025 Irwin ...................... B64C 25/10
2025/0362196 A1* 11/2025 Merk ...................... G01L 25/00

FOREIGN PATENT DOCUMENTS

CN 211519893 U * 9/2020
CN 117246526 A * 12/2023 ................ B64F 5/60
CN 119551213 A * 3/2025 ................ B64F 5/60
EP 4245667 A1 * 9/2023 ................ B64F 5/60

* cited by examiner

*Primary Examiner* — Stephanie E Bloss
*Assistant Examiner* — Diana Hancock
(74) *Attorney, Agent, or Firm* — Ingrassia Fisher & Lorenz, LLP

(57) ABSTRACT

Disclosed here is an aircraft landing gear support fixture suitable for supporting a grounded aircraft for testing purposes. The support fixture includes a strut having a longitudinal strut axis, an upper strut end, and a lower strut end. The upper strut end has attachment structure that is compatibly shaped, sized, and configured to attach the strut to the aircraft in lieu of a landing gear strut of the aircraft. The support fixture also includes a support platform to support the strut, wherein the support platform is in a fixed position relative to a stationary reference foundation. A strut force sensor is coupled between the lower strut end and the support platform to provide sensor output associated with load imparted by the strut. The strut, the strut force sensor, and the support platform are coupled together and arranged to inhibit movement of the strut along the longitudinal strut axis.

21 Claims, 12 Drawing Sheets

AIRCRAFT LANDING GEAR SUPPORT FIXTURES

TECHNICAL FIELD

Embodiments of the subject matter described herein relate generally to the testing of vehicles such as aircraft. More particularly, embodiments of the disclosed subject matter relate to fixtures that support an aircraft during grounded testing procedures.

BACKGROUND

Flight testing of a vehicle, such as an aircraft, can be performed to monitor, characterize, or measure loads on the aircraft structure in real-time during flight operations. Sensors mounted to the aircraft structure capture data that can be analyzed and processed in an appropriate manner to obtain information related to mechanical loading, vibrations, stress, strain, and the like. In this regard, the sensor data can be processed using appropriate algorithms or equations to obtain the desired in-flight measurements. These algorithms or equations can be derived from a calibration procedure that applies known load conditions to a test aircraft that is temporarily grounded and outfitted in a test setup with calibrating sensors. Thus, the test setup serves as a calibrating structure for purposes of creating the algorithms and equations that are ultimately used for in-flight testing procedures of the test aircraft. In this regard, the algorithms and equations developed as a result of the ground-based testing can accurately predict the in-flight loads experienced by the aircraft.

During the calibration procedure, the test aircraft is supported and restrained by one or more fixtures that reside on a stationary reference surface or foundation, e.g., a rigid floor or concrete foundation. The fixtures support the test aircraft while a number of known loads are applied at predetermined positions on the aircraft structure. The test aircraft is typically supported at the landing gear structures (nose landing gear and main landing gear) using suitably arranged fixtures or supports.

Accordingly, it is desirable to have improved support fixtures that accommodate ground testing of aircraft. In particular, it is desirable to have improved support fixtures that are designed and configured to accommodate high loading conditions, while being quick and easy to locate, deploy, and remove. Furthermore, other desirable features and characteristics will become apparent from the subsequent detailed description and the appended claims, taken in conjunction with the accompanying drawings and the foregoing technical field and background.

BRIEF SUMMARY

Aircraft landing gear support fixtures, which are suitable for supporting a grounded aircraft during testing, are disclosed here. An aircraft landing gear support fixture according to certain embodiments includes: a strut; a support platform; a skate assembly; and a strut force sensor. The strut has a longitudinal strut axis, an upper strut end, and a lower strut end opposite the upper strut end. The upper strut end includes attachment structure that is compatibly shaped, sized, and configured to attach the strut to an aircraft under test in lieu of a landing gear strut of the aircraft under test. The support platform is in a fixed position relative to a stationary reference foundation, and it has an upper support surface. The skate assembly is coupled to the upper support surface of the support platform. The skate assembly has a skating mechanism and a load-bearing structure coupled to or integrated with the skating mechanism, wherein the skating mechanism is configured to accommodate translational motion of the load-bearing structure relative to the upper support surface. The strut force sensor is coupled between the lower strut end and the load-bearing structure, and it provides sensor output associated with load imparted by the strut. The strut, the strut force sensor, the skate assembly, and the support platform are coupled together and arranged to inhibit movement of the strut along the longitudinal strut axis.

An aircraft landing gear support system according to certain embodiments includes: a strut; a skate assembly; a strut force sensor; and a side restraint. The strut has a longitudinal strut axis, an upper strut end, and a lower strut end opposite the upper strut end. The upper strut end includes attachment structure that is compatibly shaped, sized, and configured to attach the strut to an aircraft under test in lieu of a nose landing gear strut of the aircraft under test. The skate assembly is held in a fixed position relative to a stationary reference foundation, and it includes a skating mechanism and a load-bearing structure coupled to or integrated with the skating mechanism. The skating mechanism is configured to accommodate translational motion of the load-bearing structure relative to the stationary reference foundation. The strut force sensor is coupled between the lower strut end and the load-bearing structure, and it provides sensor output associated with load imparted by the strut. The side restraint has a longitudinal side restraint axis, a first end coupled to the strut, and a second end opposite the first end. The second end is coupled to a support frame structure that is in a fixed position relative to the stationary reference foundation. The strut, the strut force sensor, and the skate assembly are coupled together and arranged to inhibit movement of the strut along the longitudinal strut axis.

An aircraft landing gear support fixture according to certain embodiments includes: a strut; a support platform; and a strut force sensor. The strut has a longitudinal strut axis, an upper strut end, and a lower strut end opposite the upper strut end. The upper strut end has attachment structure that is compatibly shaped, sized, and configured to attach the strut to an aircraft under test in lieu of a landing gear strut of the aircraft under test. The support platform is configured to support the strut, wherein the support platform is in a fixed position relative to a stationary reference foundation. The strut force sensor is coupled between the lower strut end and the support platform to provide sensor output associated with load imparted by the strut. The strut, the strut force sensor, and the support platform are coupled together and arranged to inhibit movement of the strut along the longitudinal strut axis.

Also disclosed here is a landing gear support fixture for an aircraft under test having a landing gear. A landing gear support fixture according to certain embodiments includes: an axle attachment assembly; a support platform; a skating mechanism; and at least one primary force sensor. The axle attachment assembly is compatibly shaped, sized, and configured to mate with and attach to at least one axle of the landing gear of the aircraft under test. The support platform is maintained in a fixed position relative to a stationary reference foundation, and it has an upper support surface. The skating mechanism is located on the upper support surface of the support platform, and it is configured to accommodate planar translational motion of a component supported thereon. The at least one primary force sensor is/are coupled between the axle attachment assembly and a load-bearing component. The at least one primary force sensor provides sensor output associated with load imparted by the landing gear of the aircraft under test when the load-bearing component engages the skating mechanism.

A landing gear support system according to certain embodiments includes: an axle attachment assembly; a stationary support platform; a skating mechanism; at least one primary force sensor; a longitudinal restraint; and a longitudinal force sensor. The axle attachment assembly is compatibly shaped, sized, and configured to mate with and attach to at least one axle of a main landing gear of the aircraft under test. The stationary support platform has an upper support surface, and the skating mechanism is located on the upper support surface. The skating mechanism is configured to accommodate translational motion of a component supported thereon. The at least one primary force sensor is/are coupled between the axle attachment assembly and a load-bearing component, wherein the at least one primary force sensor provides sensor output associated with load imparted by the main landing gear of the aircraft under test when the load-bearing component engages the skating mechanism. The longitudinal restraint is coupled to to or integrated with the stationary support platform, and the longitudinal force sensor is coupled between the longitudinal restraint and the axle attachment assembly. The longitudinal force sensor provides sensor output associated with loading caused by the axle attachment assembly and the longitudinal restraint.

A landing gear support fixture according to certain embodiments includes: an axle attachment assembly; a support platform; and a force sensor. The axle attachment assembly is compatibly shaped, sized, and configured to mate with and attach to at least one axle of the landing gear of the aircraft under test. The support platform is configured to support the axle attachment assembly, and the support platform is in a fixed position relative to a stationary reference foundation. The force sensor is couplable between the axle attachment assembly and the support platform to provide sensor output associated with load imparted by the landing gear of the aircraft under test.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
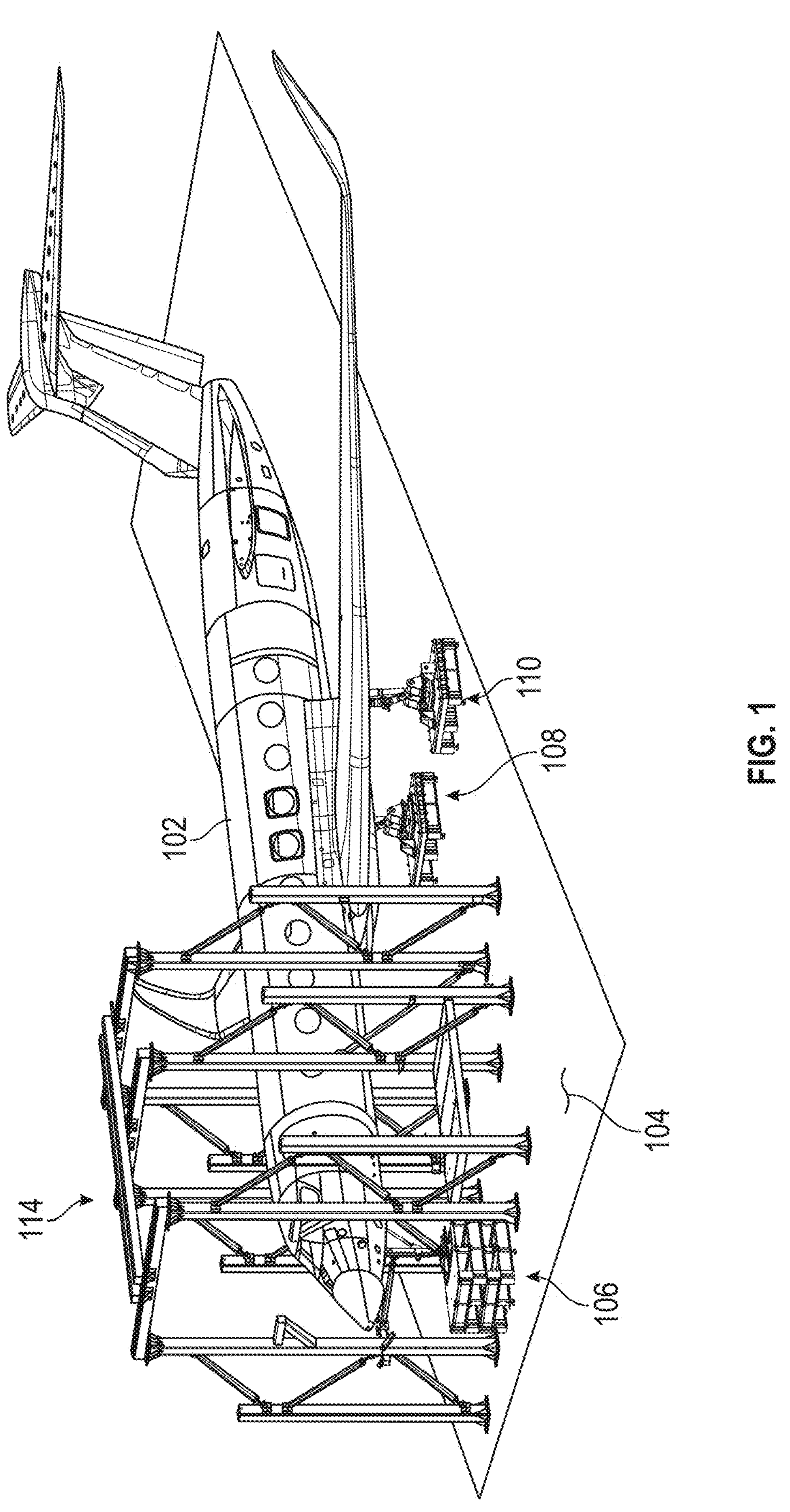
FIG. 1 is a front perspective view illustrating an aircraft supported by fixtures for performance of ground testing in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although a given figure might depict an exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" might refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to structural load testing, the collection and processing of force measurement data, strain measurement data, and other characterizing measurement data, the calibration and development of equations, formulas, or algorithms that characterize loading of structures such as aircraft, and other functional aspects of the disclosed fixtures and systems (and the individual operating components of the systems) may not be described in detail herein.

System Environment

FIG. 1 is a front perspective view illustrating an aircraft 102 supported by and resting on an aircraft landing gear support system configured and arranged in accordance with an exemplary embodiment. The support system includes support fixtures for use during ground testing, maintenance, or the like. Ground testing of the aircraft 102 can be performed in any suitable environment that includes or cooperates with a stationary reference foundation 104 upon which the aircraft 102 can be supported and maintained in a fixed and stable position. To this end, the stationary reference foundation 104 may be a solid, hard, and tough surface overlying or embedded in the ground or earth terrain, such as a solid foundation, a concrete slab, a flat steel substrate or floor, etc. The stationary reference foundation 104 provides a nonmoving and fixed support surface for the aircraft 102 when resting on the support fixtures. For the illustrated embodiment, the stationary reference foundation 104 serves as the support surface for a nose gear support fixture 106, a right main gear support fixture 108, and a left main gear support fixture 110. Alternative embodiments may include additional landing gear support fixtures (or less than three landing gear support fixtures) as appropriate for the particular aircraft configuration, testing requirements, test environment, etc.

The nose gear support fixture 106, the right main gear support fixture 108, and the left main gear support fixture 110 are each located and fixed in the desired position on the stationary reference foundation 104. These support fixtures can be rigidly coupled to the stationary reference foundation 104 using appropriate fasteners, clamps, mechanisms, or components. The testing environment may also include at least one support frame structure 114 that is in a fixed position relative to the stationary reference foundation 104. An exemplary embodiment of a support frame structure 114 may include any number of vertical supports rigidly attached to the stationary reference foundation 104, any number of joists or horizontal supports, any number of cross-member supports, any number of diagonal supports, or the like. For example, FIG. 1 depicts one support frame structure 114 that surrounds the front region of the aircraft 102 that is under test.

Nose Landing Gear Support Fixture

Figure 2:
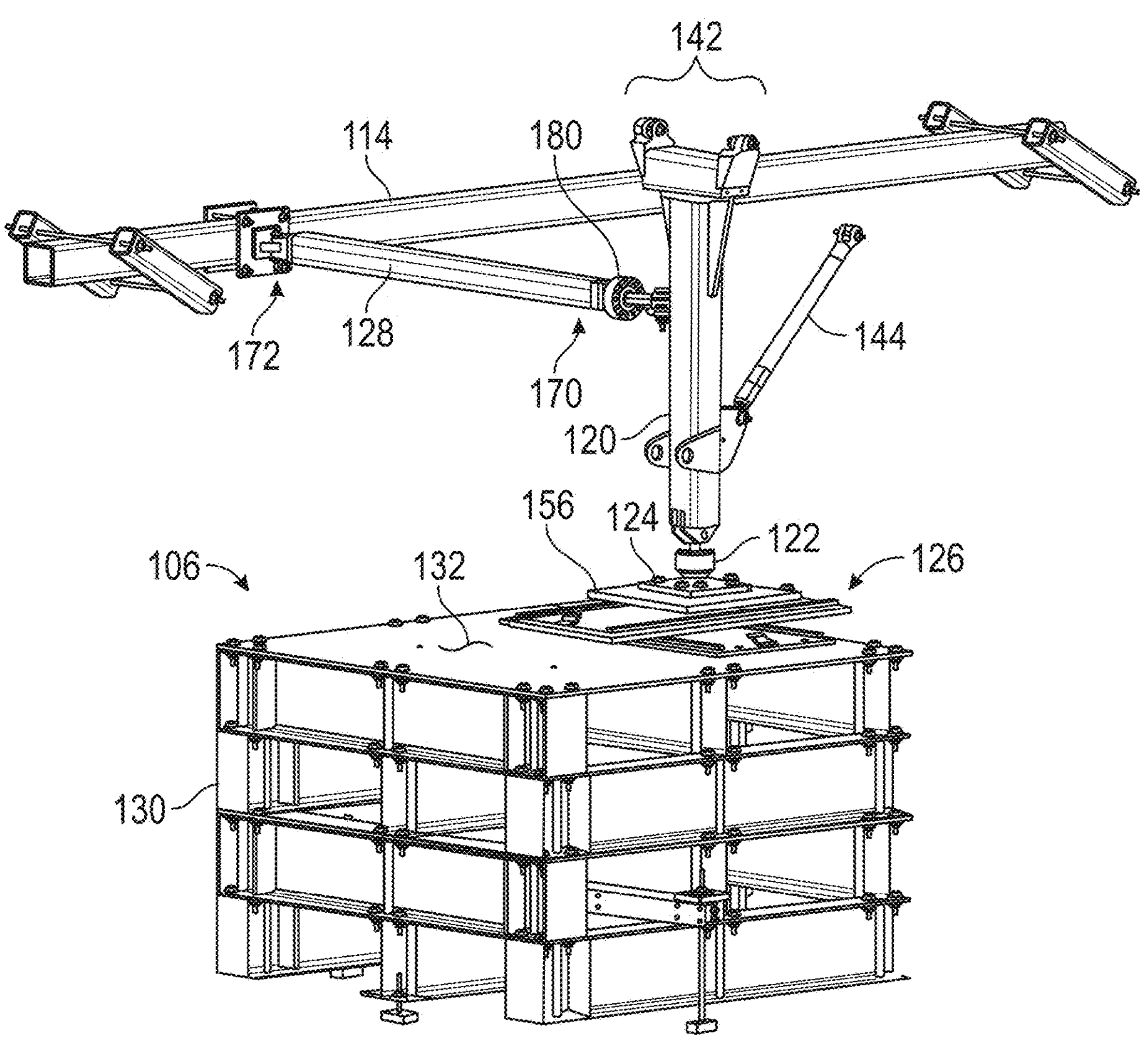
FIG. 2 is a perspective view of a nose gear support fixture as arranged in accordance with an exemplary embodiment.
Figure 3:
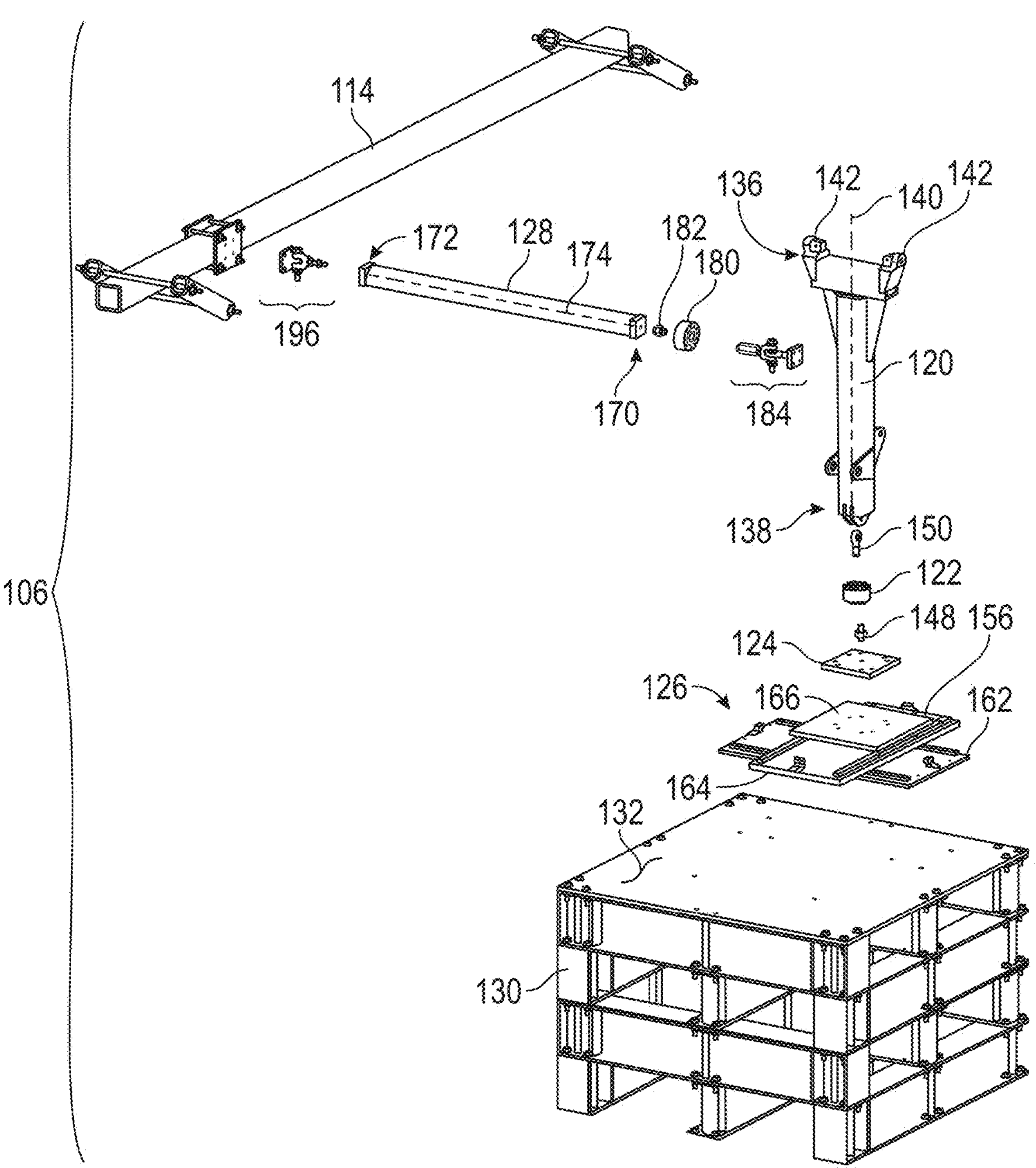
FIG. 3 is an exploded perspective view that shows various components of the nose gear support fixture.
Figure 4:
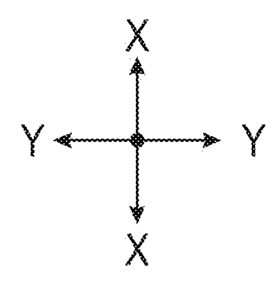
FIG. 4 is a top view that depicts a support platform and a skate assembly suitable for use with the nose gear support fixture.
Figure 4:
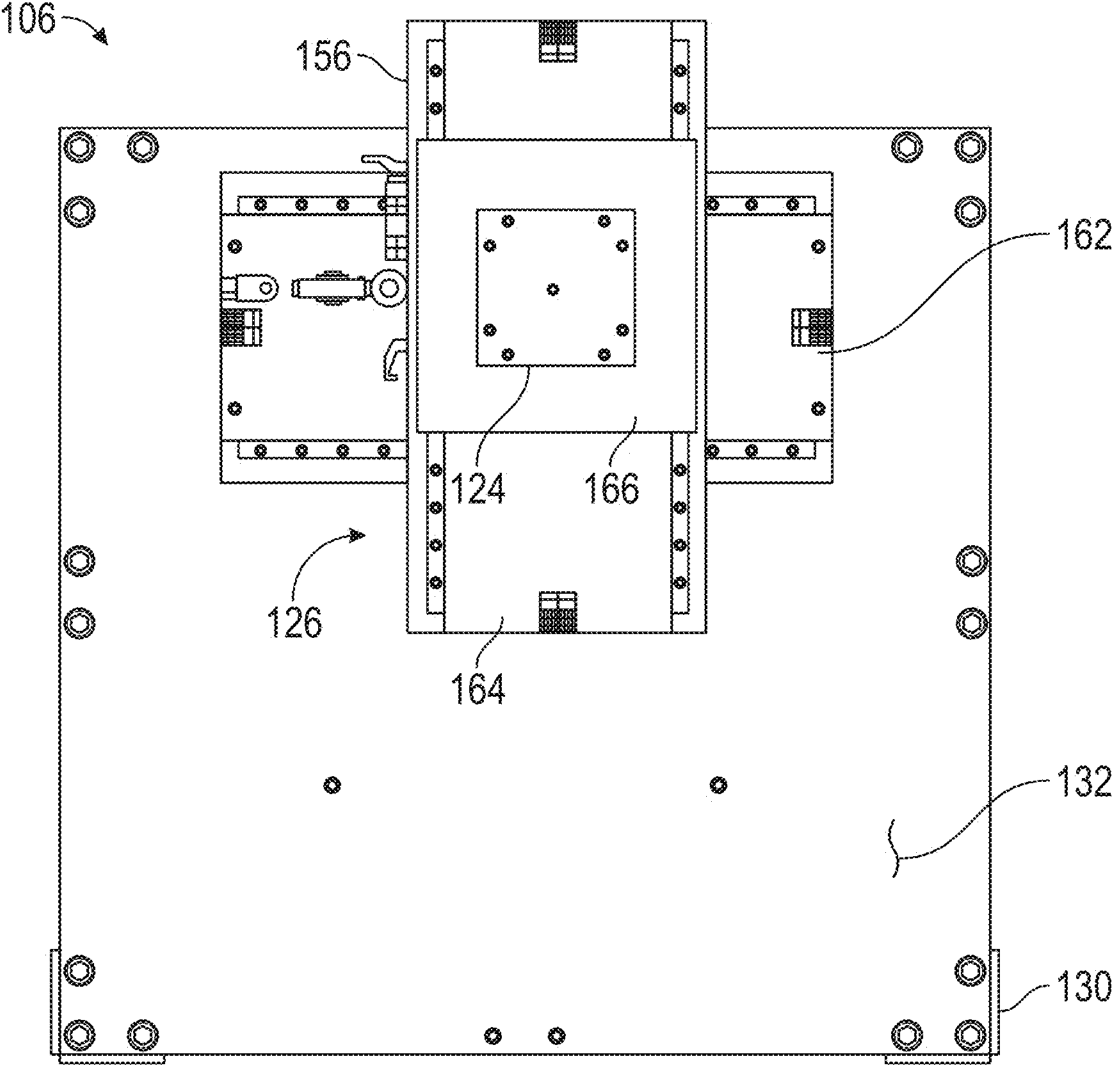

FIG. 2 is a perspective view of an exemplary embodiment of the nose gear support fixture 106, FIG. 3 is an exploded perspective view that shows various components of the nose gear support fixture 106, and FIG. 4 is a top view that depicts certain components of the nose gear support fixture 106. The illustrated embodiment of the nose gear support fixture 106 includes, without limitation: a strut 120; a strut force sensor 122; a load-bearing structure 124; a skate assembly 126; and a side restraint 128. The nose gear support fixture 106 includes or cooperates with a nose gear support platform 130 that is used to support the strut 120 (this description considers the nose gear support platform 130 to be a component of the nose gear support fixture 106).

The nose gear support platform 130 resides in a fixed position relative to the stationary reference foundation 104. In this regard, the nose gear support platform 130 may include features or cooperating components that facilitate placement and securing of the nose gear support platform 130 to the stationary reference foundation 104. For example, the nose gear support platform 130 may include legs, feet, and/or baseplates that accommodate fasteners or couplers that can be used to secure the nose gear support platform 130 to the stationary reference foundation 104. Moreover, the nose gear support platform 130 may include any number of adjustable elements, such as height-adjustable feet or levelers, that can be adjusted as needed to level or otherwise configure an upper support surface 132 of the nose gear support platform 130. The deployment contemplated by this disclosure utilizes a level, horizontal, and planar upper support surface 132, which is provided by the particular configuration and adjustment of the nose gear support platform 130.

The nose gear support platform 130 can be fabricated from any suitable material or combination of materials that provide the required structural characteristics needed to support the weight of the aircraft 102. For example, the nose gear support platform 130 can be fabricated from metal beams, frames, or plates.

The strut 120 can be fabricated as a weldment or a machined metal part having the desired structural and mechanical properties. With reference to FIG. 3, the strut 120 has an upper strut end 136, a lower strut end 138 opposite the upper strut end 136, and a longitudinal strut axis 140 corresponding to the major axis of the strut 120 that extends between the upper strut end 136 and the lower strut end 138. FIG. 3 shows a portion of the longitudinal strut axis 140 in dashed lines. The upper strut end 136 includes or cooperates with attachment structure 142 that is compatibly shaped, sized, and configured to attach the strut 120 (more specifically, the upper strut end 136 of the strut 120) to the aircraft under test in lieu of a landing gear strut of the aircraft under test. In accordance with certain embodiments, the attachment structure 142 includes two bracket features that allow the strut 120 to be removably coupled to corresponding structural features of the aircraft under test. The attachment structure 142 is designed and configured such that the strut 120 can serve as a direct, quick, and easy replacement of a nose landing gear strut that would otherwise be installed in that location. The attachment structure 142 is designed, configured, and arranged to attach the strut 120 to the aircraft under test in a rigid, fixed, and stationary manner relative to the surrounding structure of the aircraft under test (the strut 120 is not designed to pivot or move at its mounting point).

The nose gear support fixture 106 may include or cooperate with a diagonal support bar 144 (see FIG. 1) that is couplable between the strut 120 and a fixed location on the aircraft under test. The diagonal support bar 144 provides additional structural support to the strut 120, and helps to maintain the strut 120 in the desired position during ground testing.

The strut force sensor 122 is couplable between the lower strut end 138 and the load-bearing structure 124, and it is arranged and configured to provide sensor output that is associated with load imparted by the strut 120. In accordance with certain embodiments, the strut force sensor 122 is a load cell that generates an electrical signal output corresponding to the amount of force or load applied thereto (compression or tension). For the depicted embodiment, the bottom of the strut force sensor 122 is attached to the top of the load-bearing structure 124 using a threaded fastener 148, and the top of the strut force sensor 122 is coupled to the lower strut end 138 via a spherical bearing 150. Although not always required, an exemplary embodiment of the strut force sensor 122 is rated to handle loads up to 50,000 pounds.

Figure 5:
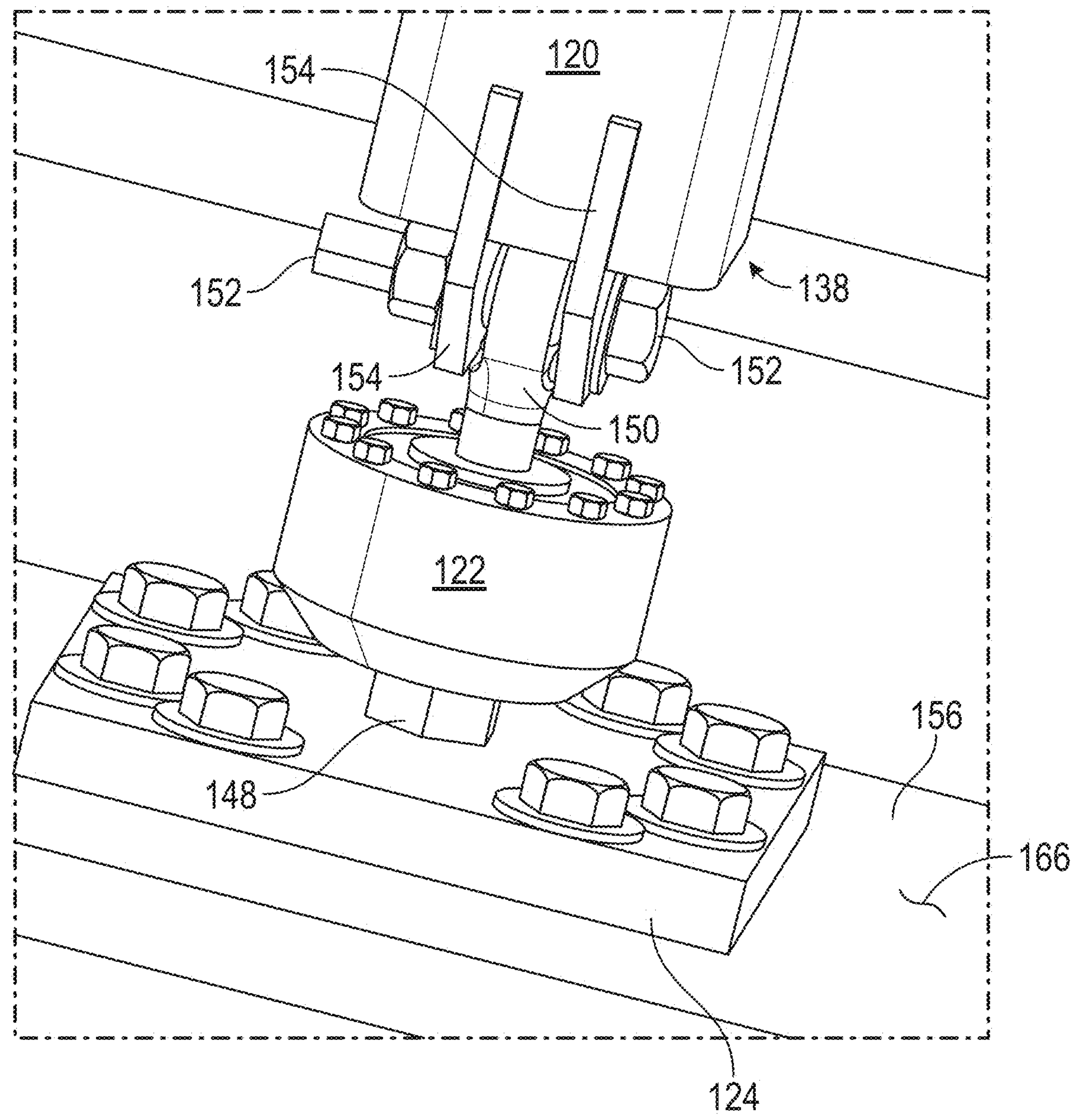
FIG. 5 is a perspective view that shows a strut force sensor and cooperating components suitable for use with the nose gear support fixture.

FIG. 5 is a perspective view that shows the strut force sensor 122 as installed between the lower strut end 138 and the load-bearing structure 124. The threaded fastener 148 secures the bottom of the strut force sensor 122 to the load-bearing structure 124 in a fixed and stationary manner. In contrast, the spherical bearing 150 can pivot about a hinge axis defined by a connection pin or bolt 152 and rotate within certain limits that are defined by the attachment features 154 (e.g., mounting brackets) of the lower strut end 138 that receive and accommodate the spherical bearing 150. The spherical bearing 150 and cooperating structure of the lower strut end 138 allow a limited amount of movement of the strut 120 relative to the strut force sensor 122, which is desirable to reduce the presence of undesirable moments or torque in the system under test.

The skate assembly 126 is coupled between the upper support surface 132 (of the nose gear support platform 130) and the strut 120. More specifically, the bottom of the skate assembly 126 is attached to the upper support surface 132, and the top of the skate assembly 126 is attached to the load-bearing structure 124. Thus, the skate assembly 126 is held in a fixed position relative to the stationary reference foundation 104, using the nose gear support platform 130 as a foundation. The illustrated embodiment of the skate assembly 126 includes a multi-part skating mechanism 156 that accommodates translational movement of the load-bearing structure 124 and, therefore, corresponding translational movement of the strut 120. It should be appreciated that the load-bearing structure 124 may be considered to be a component of the skate assembly 126. Accordingly, the load-bearing structure 124 can be coupled to or integrated with the skating mechanism 156. In this regard, the load-bearing structure 124 can be omitted in some embodiments, such that the strut force sensor 122 is affixed directly to the top of the skating mechanism 156.

The skating mechanism 156 is configured to accommodate planar translational motion of the load-bearing structure 124 relative to the upper support surface 132 of the nose gear support platform 130. In other words, the skating mechanism 156 allows the load-bearing structure 124 to shift in a translation plane that is parallel to the planar upper support surface 132. In accordance with the depicted embodiment, the skating mechanism 156 includes: a first skate plate 162 coupled to the upper support surface 132 of the nose gear support platform 130; a second skate plate 164 coupled to and overlying the first skate plate 162; and a third skate plate 166 coupled to and overlying the second skate plate 164. The first skate plate 162 is secured to the upper support surface 132 such that it remains stationary (no movement relative to the upper support surface 132). The first skate plate 162 and the second skate plate 164 are cooperatively coupled together to enable translational motion of the second skate plate 164 relative to the first skate plate 162. The second skate plate 164 and the third skate plate 166 are cooperatively coupled together to enable translational motion of the third skate plate 166 relative to the second skate plate 164. The load-bearing structure 124 can be affixed to the third skate plate 166 (as depicted in the figures), or it can be integrally formed as a part or feature of the third skate plate 166.

Referring to the top of FIG. 4, a three-axis reference coordinate system for the illustrated test environment includes orthogonal x, y, and z axes. The x-axis corresponds to an axis that is parallel to the major longitudinal axis of the aircraft 102, and the y-axis corresponds to an axis that is perpendicular to the major longitudinal axis of the aircraft 102. The z-axis corresponds to an axis that is perpendicular to both the x-axis and the y-axis. In practice, the x-axis and the y-axis can define a horizontal plane that is parallel to the upper support surface 132 of the nose gear support platform 130, and the z-axis represents a vertical axis, which may be parallel to the longitudinal strut axis 140 of the strut 120.

Using the illustrated reference coordinate system as a descriptive tool, movement of the second skate plate 164 (relative to the first skate plate 162) is restricted to an axis that is parallel to the y-axis. Similarly, movement of the third skate plate 166 (relative to the second skate plate 164) is restricted to an axis that is parallel to the x-axis. The depicted embodiment of the skate assembly 126 employs a first slide rail system to moveably couple the first skate plate 162 to the second skate plate 164, and a second slide rail system to moveably couple the second skate plate 164 to the third skate plate 166. Cooperation of the two slide rail systems accommodates translational movement of the third skate plate 166 in two dimensions, relative to the stationary upper support surface 132. The skate plates and the slide rail components can be fabricated from a strong and tough material, such as steel or aluminum, and are designed and constructed to exhibit the desired mechanical and structural properties needed to support the aircraft under test.

When deployed and arranged for ground testing of the aircraft 102, the strut 120 is held in position to inhibit or prevent upward movement thereof. To this end, the strut 120, the spherical bearing 150, the strut force sensor 122, the threaded fastener 148, the skate assembly 126 (including the load-bearing structure 124 and the skating mechanism 156), and the nose gear support platform 130 are coupled together and arranged to inhibit movement of the strut 120 along the longitudinal strut axis 140. Accordingly, the skate assembly 126 is secured to the nose gear support platform 130, and the plates of the skating mechanism 156 are designed and configured to function as a cooperating unit without separating (under normal and expected operating conditions).

Referring again to FIG. 2 and FIG. 3, the side restraint 128 can be fabricated as a weldment, an assembly, or a machined metal part having the desired structural and mechanical properties. The side restraint 128 has a first end 170, a second end 172 opposite the first end 170, and a longitudinal side restraint axis 174 that corresponds to the major longitudinal dimension of the side restraint 128. FIG. 3 depicts a portion of the longitudinal side restraint axis 174 in dashed lines. According to the disclosed embodiment, the first end 170 is coupled to the strut 120, and the second end 172 is coupled to a section of the support frame structure 114.

The nose gear support fixture 106 also includes a side restraint force sensor 180 coupled between the first end 170 of the side restraint 128 and the strut 120. The side restraint force sensor 180 is arranged and configured to provide corresponding sensor output that is associated with loading caused by the side restraint 128 and the strut 120. In accordance with certain embodiments, the side restraint force sensor 180 is a load cell that generates an electrical signal output corresponding to the amount of force or load applied thereto (tension or compression).

Figure 6:
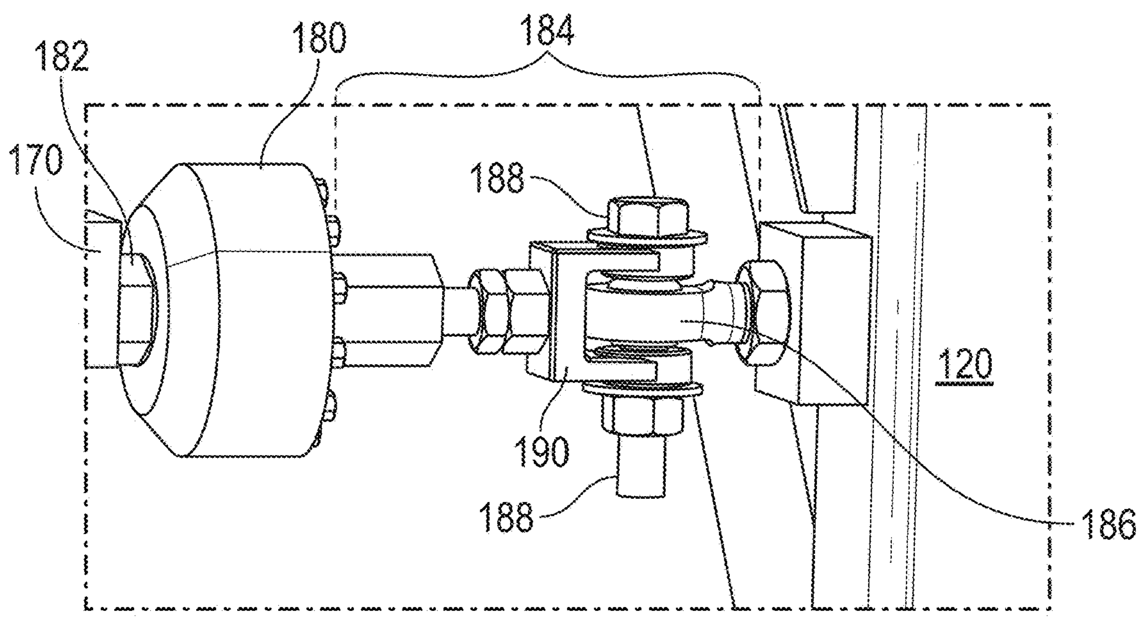
FIG. 6 is a perspective view that shows a side restraint force sensor and cooperating components suitable for use with the nose gear support fixture.

For the depicted embodiment, a distal end of the side restraint force sensor 180 is attached to the first end 170 of the side restraint 128 using a threaded fastener 182, and a proximal end of the side restraint force sensor 180 is coupled to the strut 120 via an assembly 184 that includes a spherical bearing 186. In this regard, FIG. 6 is a perspective view that shows the side restraint force sensor 180 as installed between the first end 170 of the side restraint 128 and a side of the strut 120. The threaded fastener 182 secures the distal end of the side restraint force sensor 180 to the side restraint 128 in a fixed and stationary manner. In contrast, the spherical bearing 186 can pivot about a hinge axis defined by a connection pin or bolt 188 and rotate within certain limits that are defined by a clevis structure 190, which may cooperate with the spherical bearing 186 or be provided as an integral part of the spherical bearing 186. The spherical bearing 186 and the cooperating structure of the assembly 184 allow a limited amount of movement of the side restraint 128 relative to the strut 120, which is desirable to reduce the presence of undesirable moments or torque in the system under test.

Figure 7:
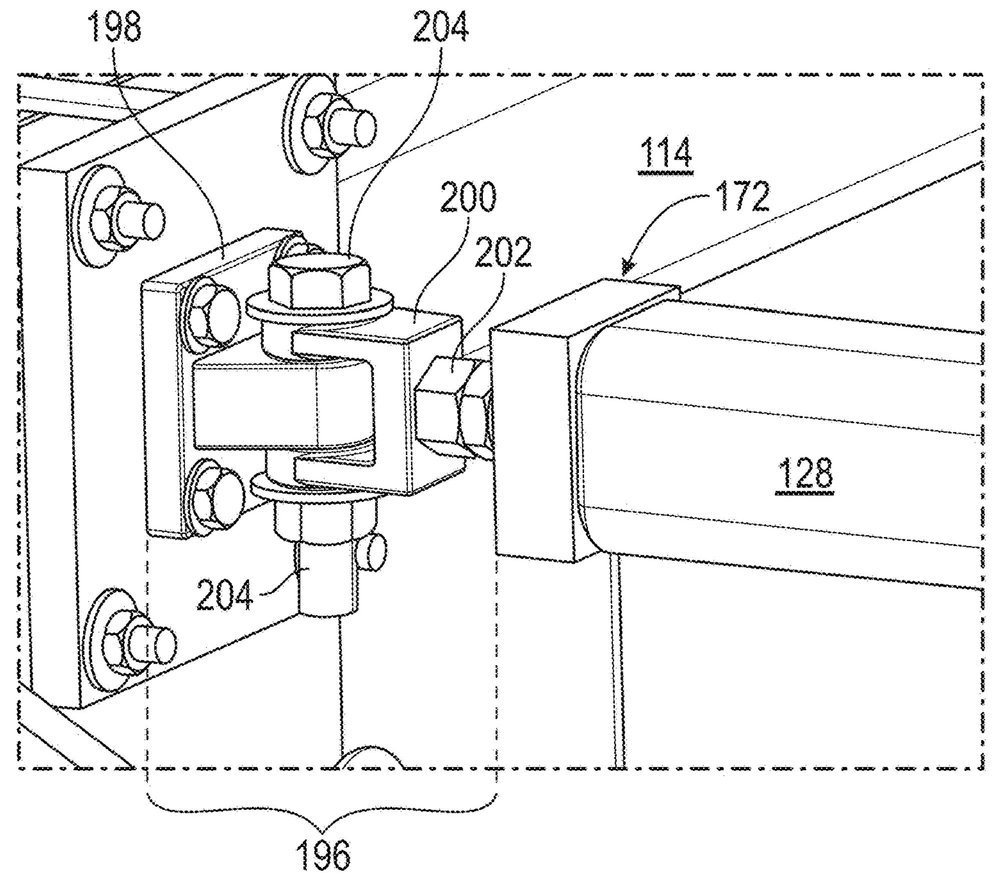
FIG. 7 is a perspective view that shows an end of a side restraint and a cooperating hinge component suitable for use with the nose gear support fixture.

FIG. 7 is a perspective view that shows the second end 172 of the side restraint 128 as installed and secured to a portion of the support frame structure 114. For the depicted embodiment, the second end 172 is coupled to the support frame structure 114 via an assembly 196. Although not always required, the disclosed version of the assembly 196 includes a mounting bracket 198, a clevis structure 200, a threaded fastener 202, and a hinge pin or bolt 204. The mounting bracket 198 is attached to the support frame structure 114, and it includes a hole formed therein to receive the hinge pin or bolt 204. The clevis structure 200 is attached to the second end 172 of the side restraint 128 such that the clevis structure 200 remains stationary relative to the second end 172. The hinge pin or bolt 204 is used to pivotally couple the clevis structure 200 to the mounting bracket 198, resulting in the arrangement shown in FIG. 7. In this arrangement, the mounting bracket 198, the clevis structure 200, and the hinge pin or bolt 204 cooperate to form a hinge component that couples the second end 172 of the side restraint 128 to the support frame structure 114. The hinge component is arranged and configured to rotate about a hinge axis that corresponds to the major longitudinal axis of the hinge pin or bolt 204.

Referring again to FIG. 2 and FIG. 3, the side restraint 128, the side restraint force sensor 180, and the support frame structure 114 are coupled together and arranged to inhibit movement of the strut 120 along the longitudinal side restraint axis 174 (which ideally corresponds to the y-dimension as indicated in FIG. 4). In practice, this arrangement is desirable to prevent or inhibit unwanted yaw rotation of the aircraft 102. As mentioned above, the side restraint force sensor 180 is coupled to the strut 120 via the spherical bearing 186—this configuration inhibits sideways motion of the strut 120 while still permitting a limited amount of rotation and swiveling at the spherical bearing 186. At the opposite end of the side restraint 128, the hinged connection permits rotation of the side restraint 128 about the hinge axis that corresponds to the hinge pin or bolt 204.

Main Landing Gear Support Fixtures

Figure 8:
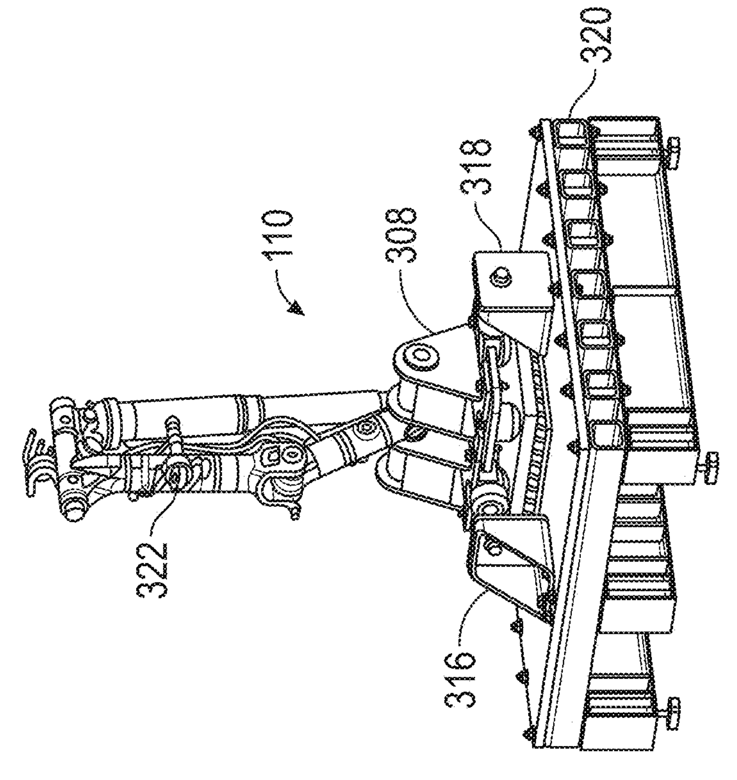
FIG. 8 is a front perspective view of right and left main gear support fixtures as arranged in accordance with an exemplary embodiment.
Figure 8:
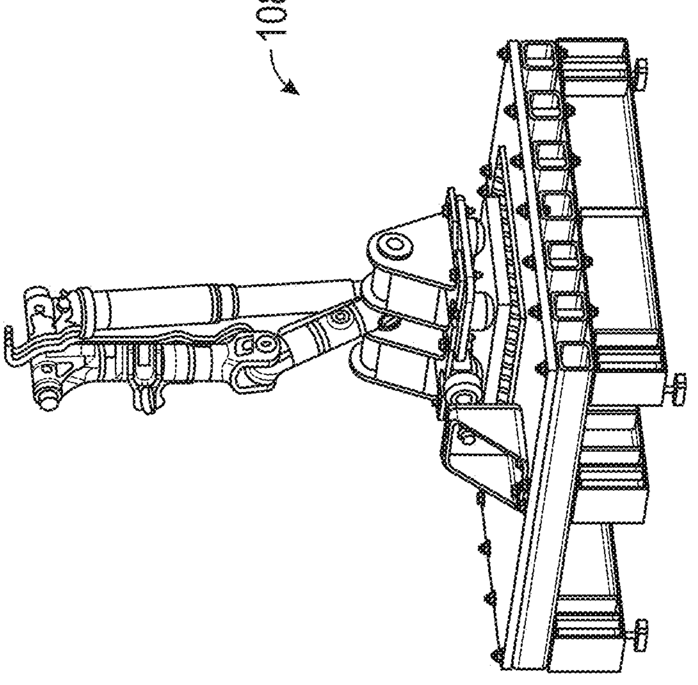
Figure 9:
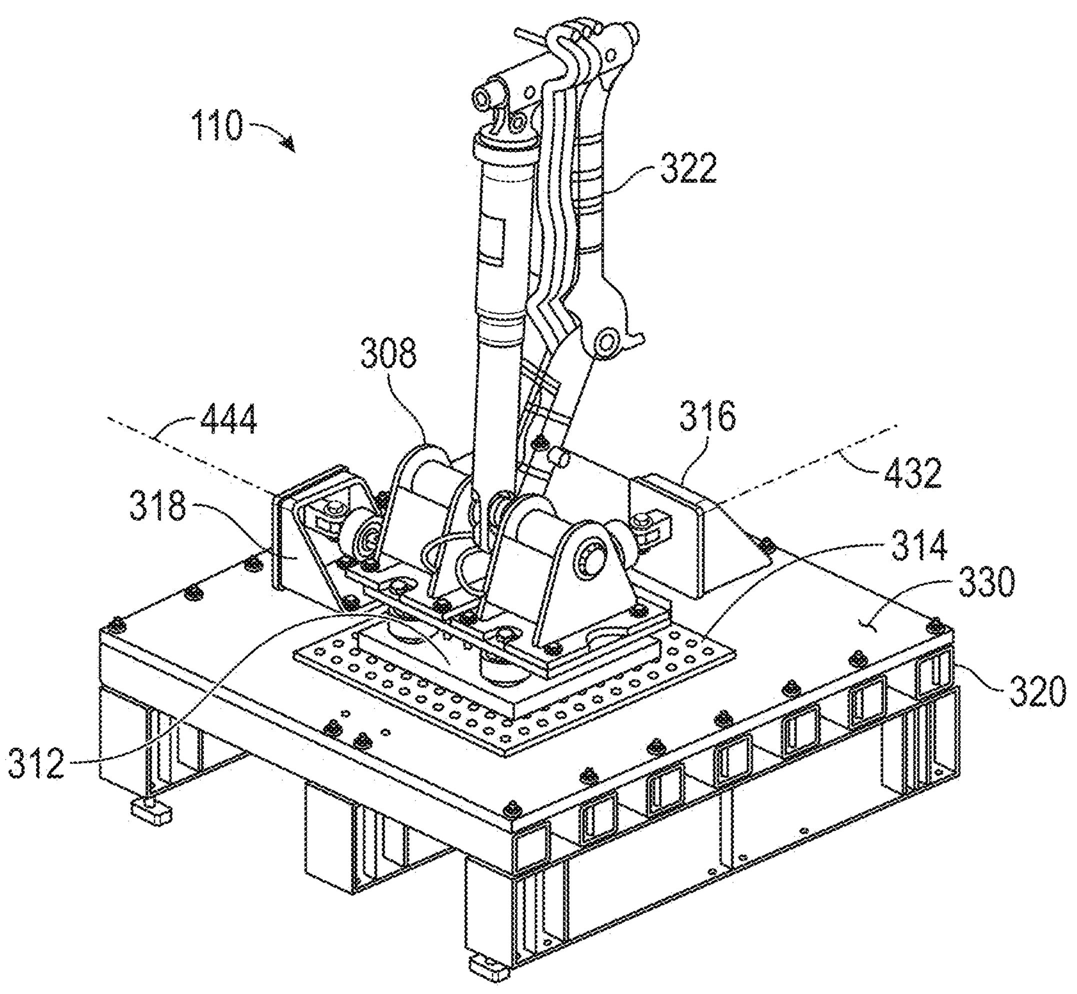
FIG. 9 is a rear perspective view of the left main gear support fixture.
Figure 10:
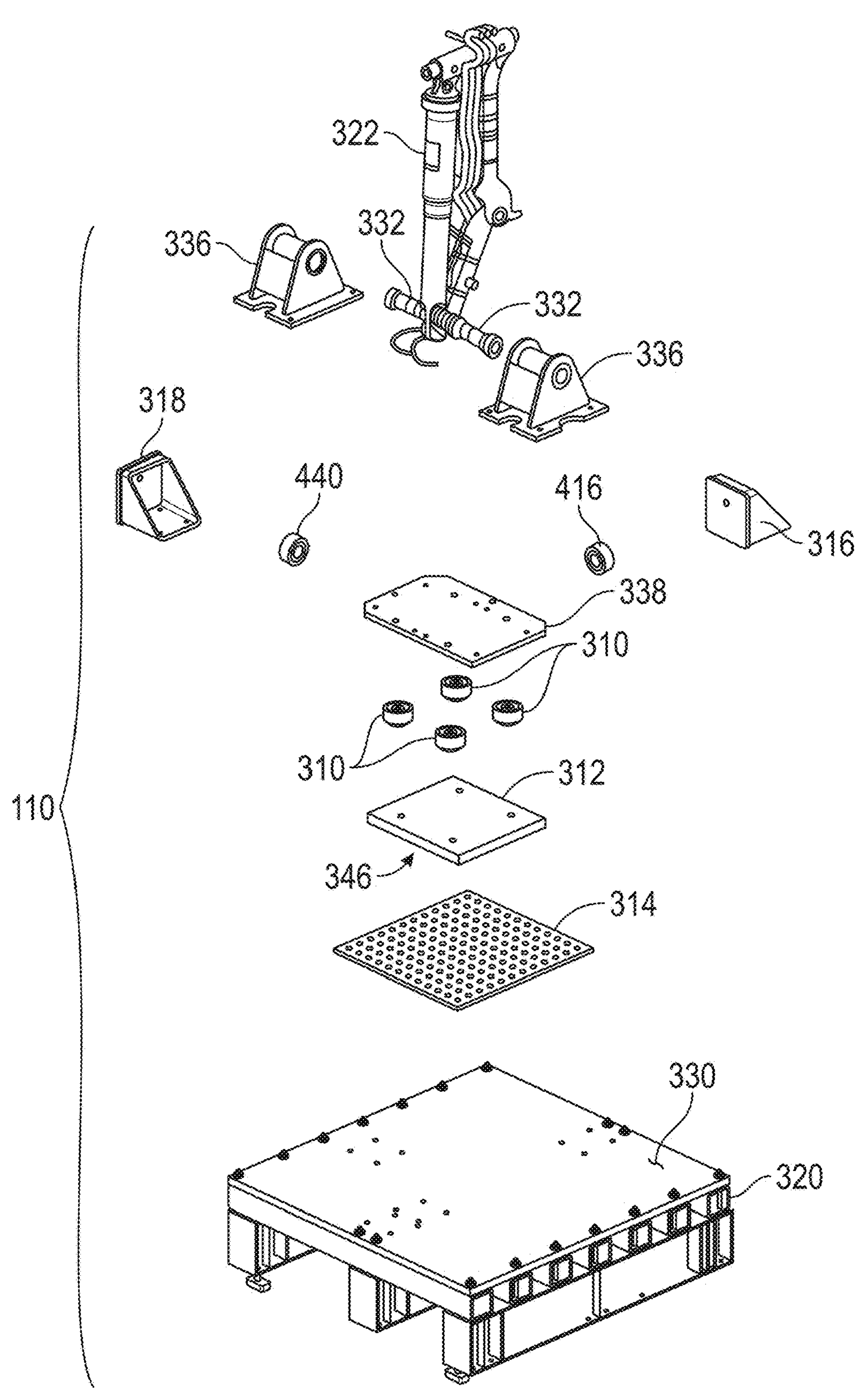
FIG. 10 is an exploded perspective view that shows various components of the left main gear support fixture.

FIG. 8 is a front perspective view of a left main gear support fixture 302 and a right main gear support fixture 304 as arranged in accordance with an exemplary embodiment. FIG. 9 is a rear perspective view of the left main gear support fixture 302, and FIG. 10 is an exploded perspective view that shows various components of the left main gear support fixture 302. For purposes of this description, the left main gear support fixture 302 includes all of the features and components of the right main gear support fixture 304. As explained in more detail below, the illustrated embodiment of the left main gear support fixture 302 includes an additional restraint feature that need not be present in the right main gear support fixture 304. Accordingly, the following description focuses on the left main gear support fixture 302, and common or equivalent aspects of these main gear support fixtures will not be redundantly described in the context of the right main gear support fixture 304.

The illustrated embodiment of the left main gear support fixture 302 includes, without limitation: an axle attachment assembly 308; at least one primary force sensor 310; a load-bearing component 312; a skating mechanism 314; a longitudinal restraint 316; and a lateral restraint 318. The left main gear support fixture 302 includes or cooperates with a main gear support platform 320 that is used to support a left main landing gear 322 of the aircraft 102 (this description considers the main gear support platform 320 to be a component of the left main gear support fixture 302).

The main gear support platform 320 resides in a fixed position relative to the stationary reference foundation 104. In this regard, the main gear support platform 320 may include features or cooperating components that facilitate placement and securing of the main gear support platform 320 to the stationary reference foundation 104. For example, the main gear support platform 320 may include legs, feet, and/or baseplates that accommodate fasteners or couplers that can be used to secure the main gear support platform 320 to the stationary reference foundation 104. Moreover, the main gear support platform 320 may include any number of adjustable elements, such as height-adjustable feet or levelers, that can be adjusted as needed to level or otherwise configure an upper support surface 330 of the main gear support platform 320. The testing environment contemplated by this disclosure utilizes a level, horizontal, and planar upper support surface 330, which is provided by the particular configuration and adjustment of the main gear support platform 320.

The main gear support platform 320 can be fabricated from any suitable material or combination of materials that provide the required structural characteristics needed to support the weight of the aircraft 102. For example, the main gear support platform 320 can be fabricated from metal beams, frames, or plates.

Figure 11:
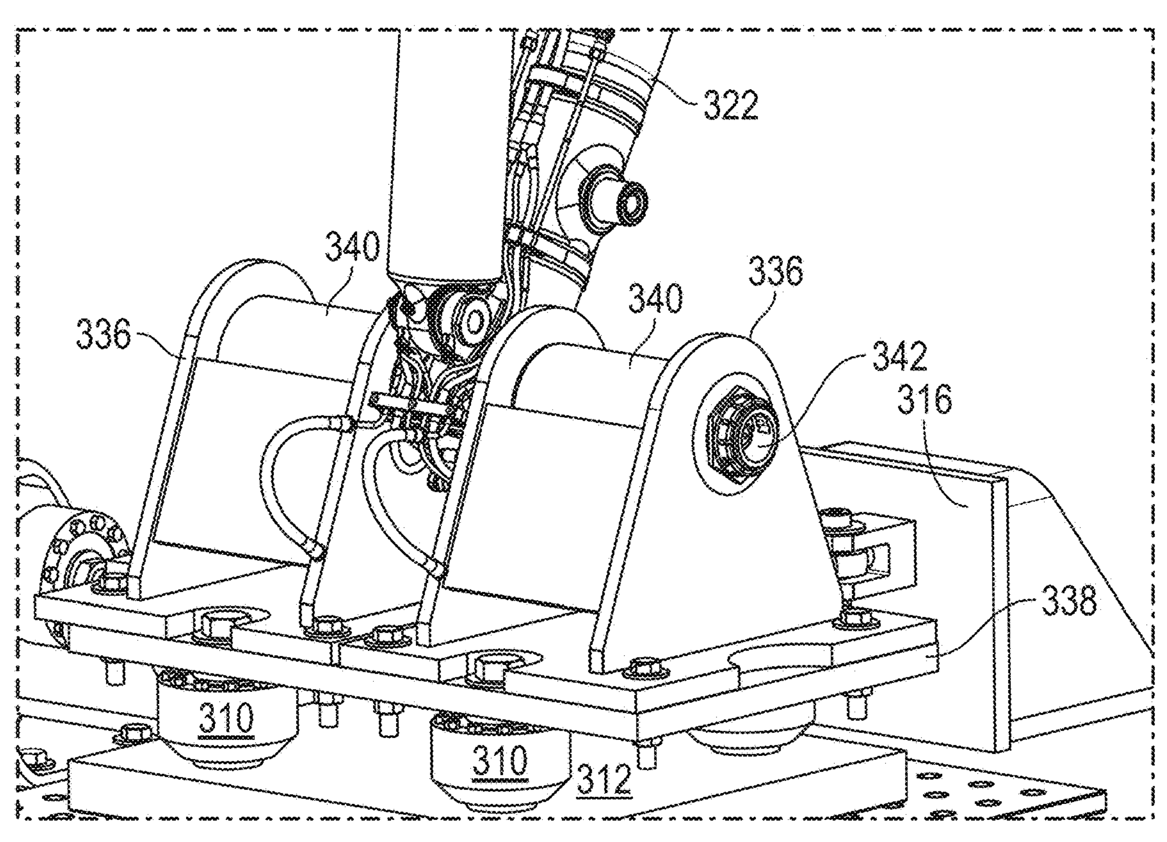
FIG. 11 is a front perspective view that shows an axle attachment assembly and cooperating components suitable for use with an embodiment of a main gear support fixture.
Figure 12:
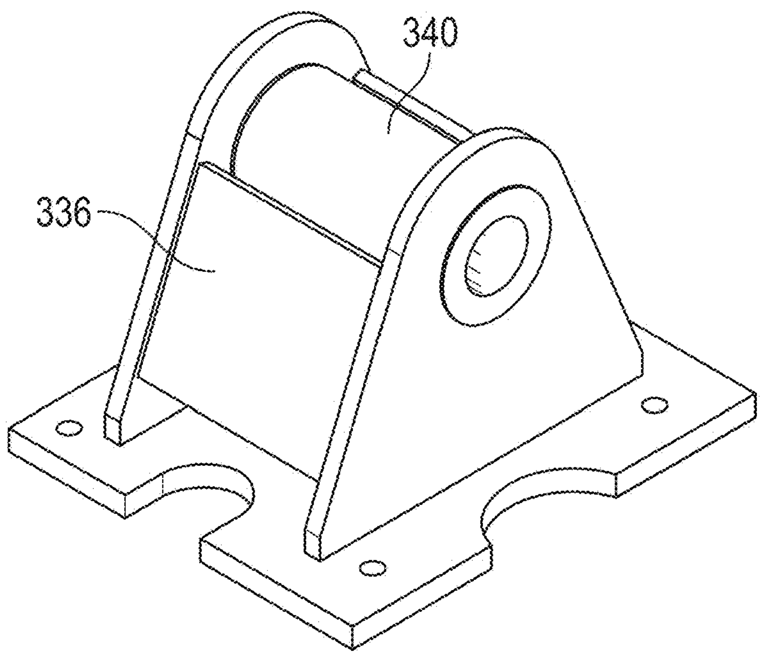
FIG. 12 is a perspective view of an axle coupling bracket suitable for use with the axle attachment assembly.
Figure 13:
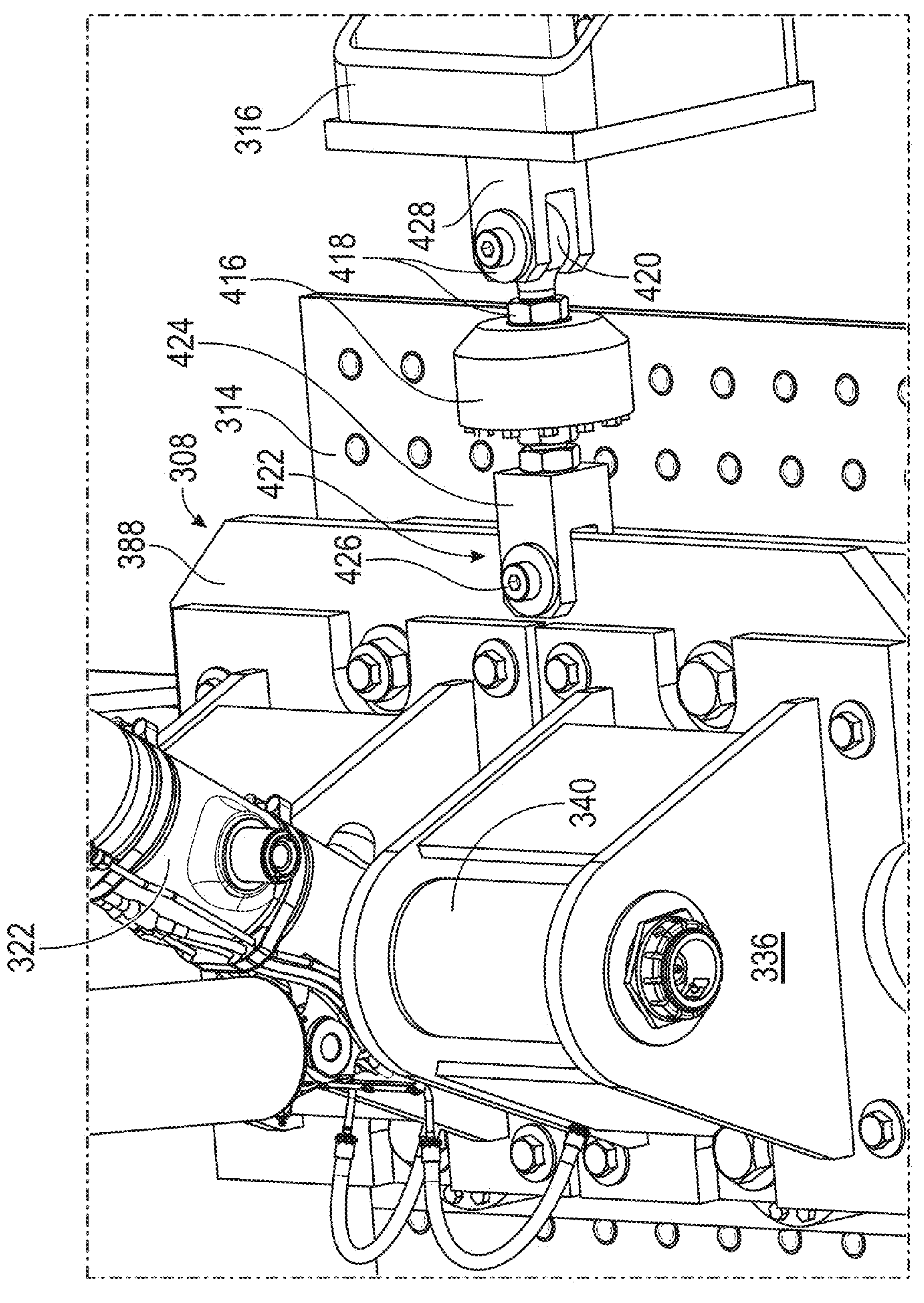
FIG. 13 is a top perspective view that shows a longitudinal restraint and a longitudinal force sensor suitable for use with the main gear support fixture.

The axle attachment assembly 308 is compatibly shaped, sized, and configured to mate with and attach to at least one axle 332 of the left main landing gear 322 (two axles 332 are shown in FIG. 10). In accordance with certain embodiments, the axle attachment assembly 308 includes, without limitation: axle coupling brackets 336; and a mounting plate 338. Each axle coupling bracket 336 includes a sleeve 340 that is machined or otherwise fabricated to receive an axle 332 of the left main landing gear 322 (see FIGS. 11-13). The sleeve 340 may be realized as a distinct subcomponent of the axle coupling bracket 336, or it could be formed as an integral part of the axle coupling bracket 336.

The axle coupling brackets 336 are designed and configured to mate with the axles 332, such that the axle coupling brackets 336 can be installed on the axles 332 in lieu of the wheels of the aircraft under test. To this end, the axle coupling brackets 336 can be secured to the axles 332 using standard axle nuts 342 for the aircraft under test. In accordance with certain embodiments, the axle nuts 342 maintain the axle coupling brackets 336 on the axles 332 while still permitting an amount of rotation of the axle coupling brackets 336 about the axles 332 before the axle nuts are torqued. Once the axle nuts 342 are torqued, the axle coupling brackets 336 are intended to be stationary (they are not designed to move after the axle nuts 342 have been tightened. Thus, the axle coupling brackets 336 can be rotated as needed during setup and thereafter fixed in place with the axle nuts 342. The mounting plate 338 can be installed after the axle coupling brackets 336 have been placed into position on the respective axles 332. In accordance with the illustrated embodiment, the axle coupling brackets 336 are secured to the mounting plate 338 using nuts and bolts and/or any suitable fastener components (see FIG. 11).

Although any number of primary force sensors 310 can be utilized, the embodiment described here includes four primary force sensors 310 that are couplable between the axle attachment assembly 308 and the left main gear support platform 320. More specifically, the primary force sensors 310 are coupled between the bottom of the mounting plate 338 and the top of the load-bearing component 312. Each primary force sensor 310 is arranged and configured to provide sensor output that is associated with load imparted by the left main landing gear 322 of the aircraft under test when the load-bearing component 312 engages the skating mechanism 314 (as depicted in FIGS. 8-10). In accordance with certain embodiments, each primary force sensor 310 is a load cell that generates an electrical signal output corresponding to the amount of force or load applied thereto. For the depicted embodiment, the primary force sensors 310 are attached to the mounting plate 338 and the load-bearing component 312 using threaded fasteners, e.g., bolts or screws.

The skating mechanism 314 can be located on the upper support surface 330 of the left main gear support platform 320, as shown in FIGS. 8-10. In certain embodiments, the skating mechanism 314 rests on the upper support surface 330 in a free and unrestricted manner, and it is suitably configured to accommodate planar translational motion of a component supported thereon (e.g., the load-bearing component 312 and the cooperating components that are attached to the load-bearing component 312). In this regard, the load-bearing component 312 has a lower bearing surface 346 (see FIG. 10) configured to engage the skating mechanism 314 such that the load-bearing component 312 is free to slide atop the skating mechanism 314.

Figure 14:
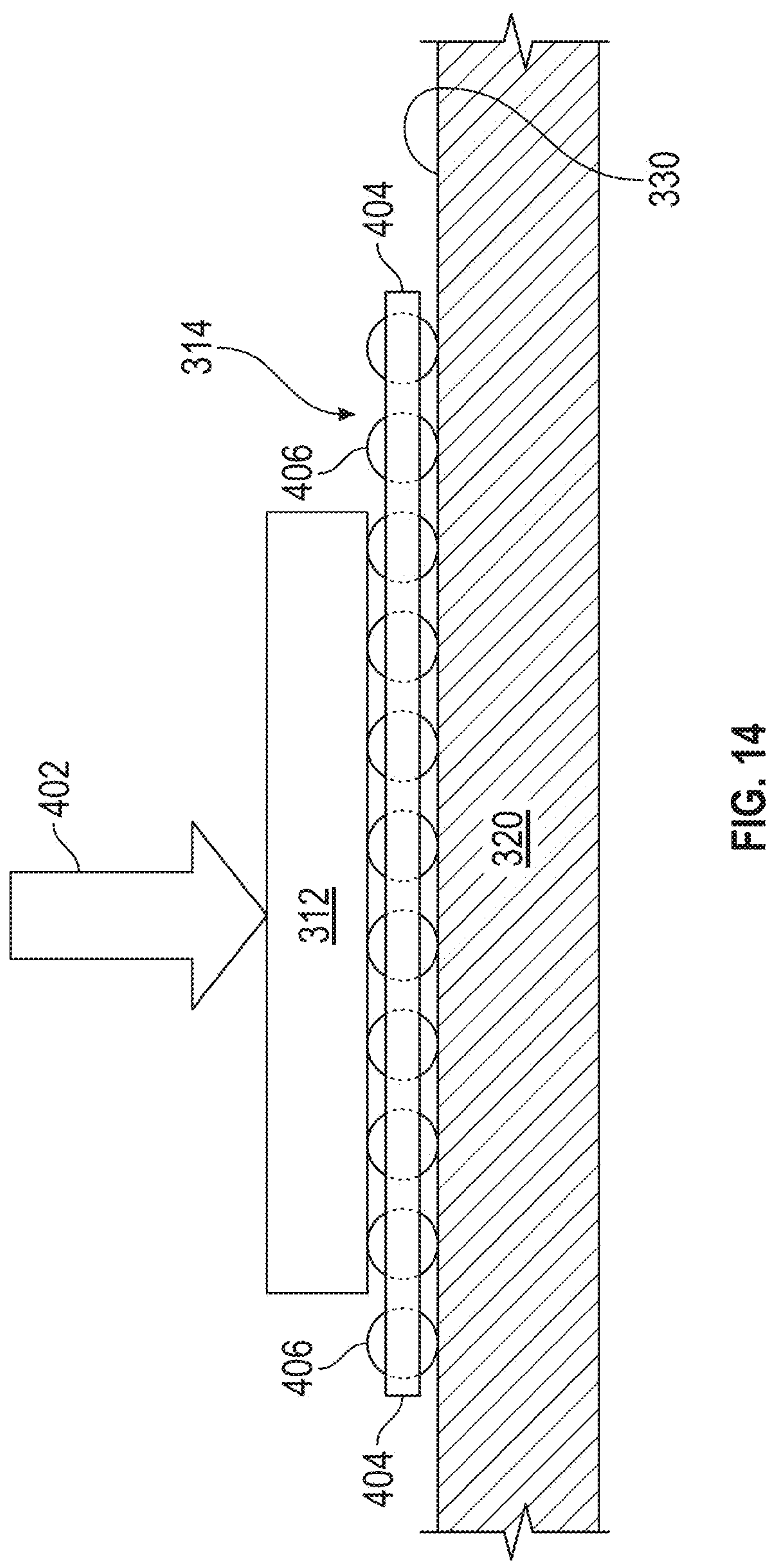
FIG. 14 is a schematic side view that shows a skating mechanism and cooperating components suitable for use with an embodiment of a main gear support fixture.

FIG. 14 is a schematic side view representation of the skating mechanism 314 in a cooperating arrangement with the overlying load-bearing component 312 and the underlying left main gear support platform 320. The arrow 402 indicates a downward force or load (e.g., as imparted by the left main landing gear 322 of the aircraft under test) that urges the skating mechanism 314 on the upper support surface 330 of the left main gear support platform 320. The depicted embodiment of the skating mechanism 314 includes a retaining plate 404 and a plurality of bearings 406 (e.g., ball bearings) held by the retaining plate 404. The retaining plate 404 is shaped, sized, and configured to retain the bearings 406 such that each of the bearings 406 is free to roll to permit planar translational motion of the load-bearing component 312 relative to the upper support surface 330 of the left main gear support platform 320. As shown in FIG. 9, the retaining plate 404 can be oversized relative to the dimensions of the load-bearing component 312, such that at least some of the bearings 406 contact and support the lower bearing surface 346 when the load-bearing component 312 engages the skating mechanism 314. Accordingly, the bearings 406 are allowed to roll freely to accommodate translation of the load-bearing component 312 in a plane that is parallel to the x-y plane defined by the upper support surface 330.

Referring again to FIGS. 8-10 and 13, the longitudinal restraint 316 can be fabricated as a weldment, an assembly, or a machined metal part having the desired structural and mechanical properties. The longitudinal restraint 316 may be attached to or integrated with the left main gear support platform 320 such that it remains in a stationary location on the upper support surface 330. In the depicted embodiment, the longitudinal restraint 316 is a distinct component that is coupled to the left main gear support platform 320 using, for example, bolts or threaded fasteners.

A longitudinal force sensor 416 is couplable between the longitudinal restraint 316 and the axle attachment assembly 308. More specifically, the longitudinal force sensor 416 is coupled between the longitudinal restraint 316 and the mounting plate 338 of the axle attachment assembly 308. The longitudinal force sensor 416 is arranged and configured to provide corresponding sensor output that is associated with loading caused by the axle attachment assembly 308 and the longitudinal restraint 316. In accordance with certain embodiments, the longitudinal force sensor 416 is a load cell that generates an electrical signal output corresponding to the amount of force or load applied thereto.

For the depicted embodiment, a distal end of the longitudinal force sensor 416 is coupled to the longitudinal restraint 316 via an assembly 418 that includes a spherical bearing 420, and a proximal end of the longitudinal force sensor 416 is coupled to the axle attachment assembly 308 via a hinge assembly 422 that includes a clevis structure 424 and a hinge pin or bolt 426. The spherical bearing 420 can pivot about a hinge axis defined by a connection pin or bolt and rotate within certain limits that are defined by a clevis structure 428 that is coupled to or integrated with the longitudinal restraint 316. The spherical bearing 420 and the cooperating structure of the assembly 418 allow a limited amount of rotational and swiveling movement of the longitudinal force sensor 416 relative to the longitudinal restraint 316, which is desirable to reduce the presence of undesirable moments or torque in the system under test. In contrast, the hinge assembly 422 is arranged and configured to rotate about a hinge axis that corresponds to the major longitudinal axis of the hinge pin or bolt 426. The longitudinal restraint 316, the longitudinal force sensor 416, and the axle attachment assembly 308 are coupled together and arranged to inhibit movement of the axle attachment assembly 308 along a restraint axis 432 (see FIG. 9) that is parallel to the major longitudinal axis of the aircraft under test. In this regard, the restraint axis 432 is also parallel to the x-axis as labeled in FIG. 4.

The left main gear support fixture 302 also includes a lateral force sensor 440 (see FIG. 10) that is coupled between the lateral restraint 318 and the axle attachment assembly 308. The functionality of the lateral force sensor 440 and the manner in which it is attached to the lateral restraint 318 and the axle attachment assembly 308 are consistent with the foregoing description of the longitudinal force sensor 416. Accordingly, these details will not be redundantly described here in the context of the lateral force sensor 440 and the lateral restraint 318. The lateral restraint 318, the lateral force sensor 440, and the axle attachment assembly 308 are coupled together and arranged to inhibit movement of the axle attachment assembly 308 along a restraint axis 444 (see FIG. 9) that is perpendicular to the restraint axis 432. In this regard, the restraint axis 444 is parallel to the y-axis as labeled in FIG. 4.

Referring again to FIG. 1, the aircraft 102 includes one nose landing gear, one right main landing gear, and one left main landing gear. Therefore, the depicted test environment utilizes one nose gear support fixture 106, one right main gear support fixture 108, and one left main gear support fixture 110, wherein the support fixtures are designed, configured, and deployed in the manner described above. The nose gear support fixture 106 is arranged and configured to inhibit lifting of the strut 120 relative to the upper support surface 132. In contrast, the main gear support fixtures 108, 110 are not specifically designed to prevent or inhibit lifting of the main landing gear relative to the main gear support platforms.

Referring to FIG. 8, the right main gear support fixture 304 is arranged and configured in accordance with the left main gear support fixture 302 (without the lateral restraint 318 and associated components that link the lateral restraint 318 to the axle attachment assembly 308). Consequently, the axle attachment assembly 308 of the left main gear support fixture 302 is restrained in two dimensions (corresponding to the x-axis and the y-axis), while the axle attachment assembly of the right main gear support fixture 304 is restrained in only one dimension (corresponding to the x-axis). In a practical system implementation, a lateral restraint can be used with either one of the main gear support fixtures 302, 304, but not both. Utilizing lateral restraints on both main gear support fixtures 302, 304 would lead to an indeterminate system, which is undesirable.

Although certain distinguishing features and elements were described above in the context of the nose gear support fixture, any of those features and elements can also be utilized with the right main gear support fixture and/or the left main gear support fixture. Likewise, although certain distinguishing features and elements were described above in the context of the main gear support fixtures, any of those features and elements can also be utilized with the nose gear support fixture. Moreover, any of the disclosed support fixtures can be utilized in the described configuration or modified or configured for use to support other structures of the vehicle under test (in addition to or in lieu of supporting landing gear).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft landing gear support fixture comprising:

a strut comprising a longitudinal strut axis, an upper strut end, and a lower strut end opposite the upper strut end, the upper strut end comprising attachment structure that is compatibly shaped, sized, and configured to attach the strut to an aircraft under test in lieu of a landing gear strut of the aircraft under test;

a support platform in a fixed position relative to a stationary reference foundation, the support platform having an upper support surface;

a skate assembly coupled to the upper support surface of the support platform, the skate assembly comprising a skating mechanism and a load-bearing structure coupled to or integrated with the skating mechanism, wherein the skating mechanism is configured to accommodate translational motion of the load-bearing structure relative to the upper support surface; and a strut force sensor coupled between the lower strut end and the load-bearing structure, the strut force sensor providing sensor output associated with load imparted by the strut;

wherein the strut, the strut force sensor, the skate assembly, and the support platform are coupled together and arranged to inhibit movement of the strut along the longitudinal strut axis.

2. The aircraft landing gear support fixture of claim 1, wherein the attachment structure is compatibly shaped, sized, and configured to facilitate replacement of a nose landing gear strut of the aircraft under test.

3. The aircraft landing gear support fixture of claim 1, wherein the skating mechanism comprises:

a first skate plate coupled to the upper support surface of the support platform;

a second skate plate coupled to and overlying the first skate plate, the first and second skate plates cooperatively coupled together to enable translational motion of the second skate plate relative to the first skate plate; and a third skate plate coupled to and overlying the second skate plate, the second and third skate plates cooperatively coupled together to enable translational motion of the third skate plate relative to the second skate plate.

4. The aircraft landing gear support fixture of claim 3, wherein the third skate plate comprises the load-bearing structure of the skate assembly.

5. The aircraft landing gear support fixture of claim 1, further comprising a spherical bearing, wherein the strut force sensor is coupled to the lower strut end via the spherical bearing.

6. The aircraft landing gear support fixture of claim 1, wherein the attachment structure is configured to attach the strut to the aircraft under test in a rigid and stationary manner.

7. The aircraft landing gear support fixture of claim 1, further comprising a side restraint comprising:

a longitudinal side restraint axis;

a first end coupled to the strut; and a second end opposite the first end, the second end coupled to a support frame structure that is in a fixed position relative to the stationary reference foundation.

8. The aircraft landing gear support fixture of claim 7, further comprising a side restraint force sensor coupled between the first end of the side restraint and the strut, the side restraint force sensor providing sensor output associated with loading caused by the side restraint and the strut;

wherein the side restraint, the side restraint force sensor, and the support frame structure are coupled together and arranged to inhibit movement of the strut along the longitudinal side restraint axis.

9. The aircraft landing gear support fixture of claim 8, further comprising a spherical bearing, wherein the side restraint force sensor is coupled to the strut via the spherical bearing.

10. The aircraft landing gear support fixture of claim 9, further comprising a hinge component that couples the second end of the side restraint to the support frame structure, the hinge component arranged and configured to rotate about a hinge axis.

11. An aircraft landing gear support system comprising:

a strut comprising a longitudinal strut axis, an upper strut end, and a lower strut end opposite the upper strut end, the upper strut end comprising attachment structure that is compatibly shaped, sized, and configured to attach the strut to an aircraft under test in lieu of a nose landing gear strut of the aircraft under test;

a skate assembly held in a fixed position relative to a stationary reference foundation, the skate assembly comprising a skating mechanism and a load-bearing structure coupled to or integrated with the skating mechanism, wherein the skating mechanism is configured to accommodate translational motion of the load-bearing structure relative to the stationary reference foundation;

a strut force sensor coupled between the lower strut end and the load-bearing structure, the strut force sensor providing sensor output associated with load imparted by the strut; and a side restraint comprising a longitudinal side restraint axis, a first end coupled to the strut, and a second end opposite the first end, the second end coupled to a support frame structure that is in a fixed position relative to the stationary reference foundation;

wherein the strut, the strut force sensor, and the skate assembly are coupled together and arranged to inhibit movement of the strut along the longitudinal strut axis.

12. The aircraft landing gear support system of claim 11, further comprising a spherical bearing, wherein the strut force sensor is coupled to the lower strut end via the spherical bearing.

13. The aircraft landing gear support system of claim 11, further comprising a side restraint force sensor coupled between the first end of the side restraint and the strut, the side restraint force sensor providing sensor output associated with loading caused by the side restraint and the strut;

wherein the side restraint, the side restraint force sensor, and the support frame structure are coupled together and arranged to inhibit movement of the strut along the longitudinal side restraint axis.

14. The aircraft landing gear support system of claim 13, further comprising a spherical bearing, wherein the side restraint force sensor is coupled to the strut via the spherical bearing.

15. The aircraft landing gear support system of claim 11, further comprising:

a right support fixture for a right main landing gear of the aircraft under test, the right support fixture comprising:

a right support platform to support the right main landing gear; and a right force sensor couplable between the right support platform and the right main landing gear to provide sensor output associated with load imparted by the right main landing gear; and a left support fixture for a left main landing gear of the aircraft under test, the left support fixture comprising:

a left support platform to support the left main landing gear; and a left force sensor couplable between the left support platform and the left main landing gear to provide sensor output associated with load imparted by the left main landing gear.

16. The aircraft landing gear support system of claim 15, wherein:

the right support fixture comprises:

a right axle attachment assembly that is compatibly shaped, sized, and configured for attachment to at least one axle of the right main landing gear; and a right skating mechanism located on the right support platform, wherein the right skating mechanism is configured to accommodate planar translational motion of a component supported thereon;

the right force sensor is coupled between the right axle attachment assembly and a right loading plate to provide sensor output associated with load imparted by the right main landing gear when the right loading plate engages the right skating mechanism;

the left support fixture comprises:

a left axle attachment assembly that is compatibly shaped, sized, and configured for attachment to at least one axle of the left main landing gear; and a left skating mechanism located on the left support platform, wherein the left skating mechanism is configured to accommodate planar translational motion of a component supported thereon; and the left force sensor is coupled between the left axle attachment assembly and a left loading plate to provide sensor output associated with load imparted by the left main landing gear when the left loading plate engages the left skating mechanism.

17. The aircraft landing gear support system of claim 16, further comprising:

a right longitudinal restraint attached to or integrated with the right support platform;

a right longitudinal force sensor coupled between the right longitudinal restraint and the right axle attachment assembly, the right longitudinal force sensor providing sensor output associated with loading caused by the right axle attachment assembly and the right longitudinal restraint;

a left longitudinal axis restraint attached to or integrated with the left support platform;

a left longitudinal force sensor coupled between the left longitudinal restraint and the left axle attachment assembly, the left longitudinal force sensor providing sensor output associated with loading caused by the left axle attachment assembly and the left longitudinal restraint;

wherein the right longitudinal axis restraint, the right longitudinal force sensor, and the right axle attachment assembly are coupled together and arranged to inhibit movement of the right axle attachment assembly along a right-side axis that is parallel to a major longitudinal axis of the aircraft under test; and wherein the left longitudinal axis restraint, the left longitudinal force sensor, and the left axle attachment assembly are coupled together and arranged to inhibit movement of the left axle attachment assembly along a left-side axis that is parallel to the major longitudinal axis of the aircraft under test.

18. The aircraft landing gear support system of claim 17, wherein the right support fixture or the left support fixture further comprises:

a lateral restraint attached to or integrated with the right or left support platform; and a lateral force sensor coupled between the lateral restraint and the right or left axle attachment assembly, the lateral force sensor providing sensor output associated with loading caused by the right axle attachment assembly and the lateral restraint, or caused by the left axle attachment assembly and the lateral restraint;

wherein the lateral restraint, the lateral force sensor, and the right or left axle attachment assembly are coupled together and arranged to inhibit movement of the right or left axle attachment assembly along a lateral axis that is perpendicular to the major longitudinal axis of the aircraft under test.

19. The aircraft landing gear support system of claim 18, further comprising:

a first spherical bearing, wherein the right longitudinal force sensor is coupled to the right longitudinal restraint via the first spherical bearing;

a second spherical bearing, wherein the left longitudinal force sensor is coupled to the left longitudinal restraint via the second spherical bearing; and a third spherical bearing, wherein the lateral force sensor is coupled to the lateral restraint via the third spherical bearing.

20. An aircraft landing gear support fixture comprising:

a strut comprising a longitudinal strut axis, an upper strut end, and a lower strut end opposite the upper strut end, the upper strut end comprising attachment structure that is compatibly shaped, sized, and configured to attach the strut to an aircraft under test in lieu of a landing gear strut of the aircraft under test;

a support platform to support the strut, wherein the support platform is in a fixed position relative to a stationary reference foundation; and a strut force sensor coupled between the lower strut end and the support platform to provide sensor output associated with load imparted by the strut, wherein the strut, the strut force sensor, and the support platform are coupled together and arranged to inhibit movement of the strut along the longitudinal strut axis.

21. The aircraft landing gear support fixture of claim 20, further comprising:

a skate assembly coupled to a planar upper support surface of the support platform, the skate assembly comprising:

a skating mechanism; and a load-bearing structure coupled to or integrated with the skating mechanism;

wherein the skating mechanism is configured to accommodate translational motion of the load-bearing structure in a translation plane that is parallel to the planar upper support surface.

* * * * *